Figure 1:
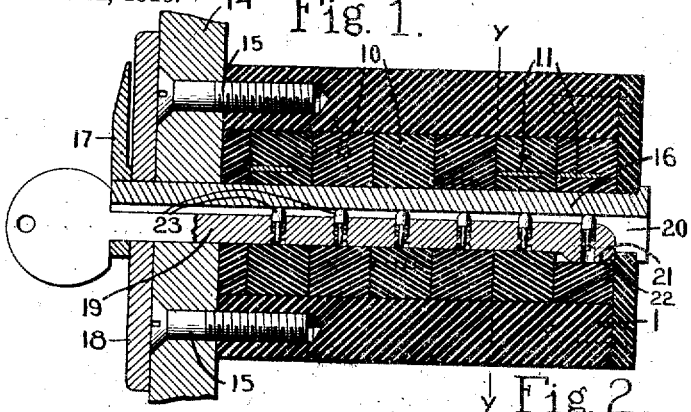

P. CYR.

LOCK FOR AUTOMOBILES.

APPLICATION FILED FEB. 10, 1916.

Reissued Mar. 14, 1916. 14,085.

Inventor
Paul Cyr
by Heard Smith & Tennant
Att'ys

UNITED STATES PATENT OFFICE.

PAUL CYR, OF BOSTON, MASSACHUSETTS, ASSIGNOR OF ONE-HALF TO WILLIAM J. DOWNEY, OF HYDE PARK, MASSACHUSETTS.

LOCK FOR AUTOMOBILES.

14,085. Specification of Reissued Letters Patent. Reissued Mar. 14, 1916.

Original No. 1,162,224, dated November 30, 1915, Serial No. 33,493. Application for reissue filed February 10, 1916. Serial No. 77,543.

*To all whom it may concern:*

Be it known that I, PAUL CYR, a citizen of the United States, residing at Boston, county of Suffolk, State of Massachusetts, have invented an Improvement in Locks for Automobiles, of which the following description, in connection with the accompanying drawing, is a specification, like characters on the drawing representing like parts.

This invention relates to locks for automobiles and has for its object to provide a novel combination lock adapted for use in connection with automobiles for preventing the theft or the unauthorized use thereof.

The lock is of that type adapted to lock the circuits of the spark plugs either opened or closed and is so constructed that when the circuits are locked open they can be closed through the lock only by a person who understands the proper combination.

My improved lock comprises a plurality of pairs of contacts, one for each of the circuits, a contact element for each pair of contacts constructed so that the contacts of each pair will be electrically connected in one position only of the contact element, and a novel device for operating the contact elements to throw them into operative position to close the circuits, which device is in the form of a combination lock that can be successfully operated only by the person who knows the proper combination.

In order to give an understanding of my invention I have shown in the drawings a selected embodiment thereof which will now be described, after which the novel features will be pointed out in the appended claims.

Figure 2:
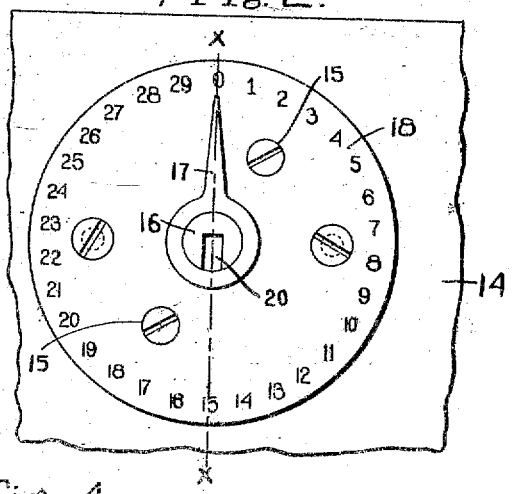
Figure 3:
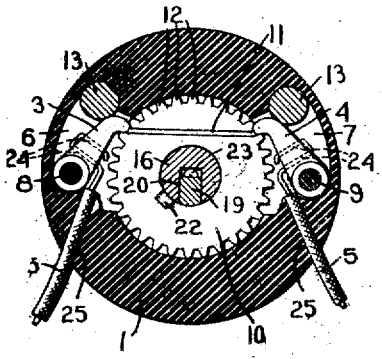
Figure 5:
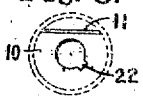
Figure 6:
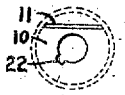
Figure 7:
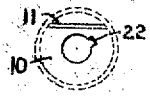
Figure 4:
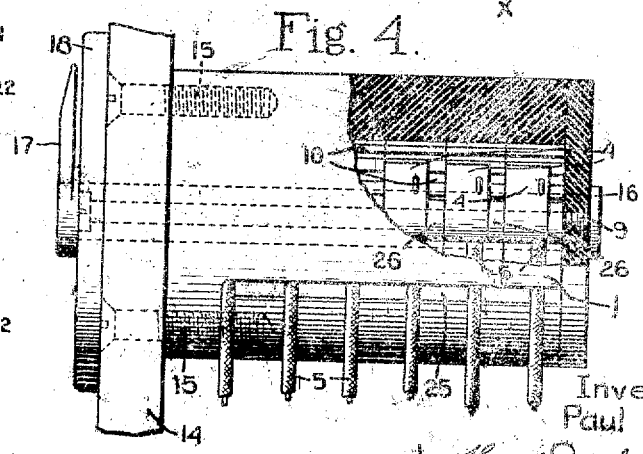

In the drawings, Figure 1 is a vertical sectional view on the line $x$—$x$, Fig. 2; Fig. 2 is a front view of Fig. 1; Fig. 3 is a section on the line $y$—$y$, Fig. 1; Fig. 4 is a side view of my improved lock with a portion broken out to better show the interior construction; Figs. 5, 6 and 7 are views showing different contact elements.

The lock herein illustrated comprises a casing 1 preferably of insulating material and having located within it a plurality of pairs of contacts, there being one pair of contacts for each of the circuits that is to be opened or closed. Where the device is to be used as an automobile lock I will preferably make it so that it will have as many pairs of contacts as there are cylinders in the automobile engine, and each pair of contacts will be in the circuit leading to one of the spark plugs.

In the illustrated embodiment of my invention I have shown a device having six pairs of contacts, but this number may be varied without departing from the invention. The contacts of each pair are designated 3 and 4, respectively, and each contact has secured thereto a wire 5 forming part of the corresponding circuit. The contacts 3 and 4 of each pair are situated on opposite sides of the casing 1 and are received in recesses 6 and 7 formed in the casing, said contacts being shown as pivotally mounted upon rods or bars 8, 9 that extend longitudinally of the casing.

Each pair of contacts 3 and 4 has associated therewith a rotative contact element 10 which will preferably be in the form of a disk of insulating material which carries a contact strip 11 of conducting material adapted when the contact element is in a predetermined position to have engagement with and electrically connect the contacts 3 and 4 of the corresponding pair, as seen in Fig. 3.

I will preferably serrate the peripheral portion of each of the disks 10 so as to provide projections 12 thereon, and the contact strip 11 is so positioned that the ends thereof come between adjacent projections 12. As a result when each disk 10 is properly positioned to electrically connect the contact members 3 and 4 of its pair, the ends of the contact members will occupy positions between adjacent projections. The contact members are yieldingly held against the periphery of the disk by some suitable means herein shown as a yieldable presser element 13 in the form of a rubber buffer. Any other suitable yielding element may be used, however.

The yielding presser elements 13 yieldingly hold the contacts 3 and 4 against the periphery of the disk 10, but as the disk is turned, said presser elements 13 permit the contacts 3 and 4 to yield sufficiently to pass over the projections 12. The engagement of the contact elements with the projections serves to frictionally hold the disk in any position in which it may be adjusted while permitting it to be turned upon the application of sufficient force.

The casing 1 is designed to be secured to the dash-board or instrument-board 14 of an automobile by any suitable means, such as screws 15. The disks 10 are shown as rotatively mounted on a central spindle 16 which extends longitudinally through the casing and through the instrument-board 14, and is rotatively mounted in the casing, the end of the spindle having a pointer or indicator 17 rigid therewith which plays over a dial 18 secured to the exposed side of the instrument-board 14.

Means are provided for independently coupling each of the disks 10 to the spindle 16 so that by so doing and then rotating the spindle the disks can be adjusted into the proper position to have their contact strips 11 operatively and electrically connect the contacts of the corresponding pair. The means for thus independently connecting each of the disks 10 to the spindle 16 comprises a key element 19 which operates in a key slot 20 extending longitudinally of the spindle 16.

Each of the disks 10 is provided with a slot 22 and the key element 19 is provided with an extension 21 which is adapted to be inserted into the slots 22 of the various disks 10. The slots 22 of the disks 10 are situated in different angular positions relative to the contact strip 11, as shown in Figs. 3, 5 and 6, so that when the disks 10 are all properly adjusted into a position in which the contact strips connect the contacts 3 and 4, the slots 22 of the different disks will be out of alinement and will occupy various angular positions. The key slot 20 is of sufficient depth to receive the extension or widened portion 21 of the key, and the key is provided with a plurality of yielding presser elements 23 in the form of yieldingly-sustained pins that engage the back side of the key slot 20 and maintain the key in the position shown in Fig. 1. In using the device, the operator inserts the key into the key slot a sufficient distance so that extension 21 thereon will come in line with the innermost disk 10 and will then turn the key until said extension drops into the notch 22 of said innermost disk. This act couples the disk to the spindle 16. The spindle 16 is then turned in order to turn the disk 10 that is locked therewith into proper position so that the contact strip 11 will electrically connect the contacts 3 and 4 of the corresponding pair. In order to do this the operator must bring the pointer 17 opposite some predetermined figure on the dial 18 which corresponds to the innermost disk 10. When the innermost disk has been properly adjusted the key is partially withdrawn until the extension 21 is in line with the next adjacent disk 10 and said key is then turned until the extension 21 is dropped into the slot 22 of said disk, after which the spindle 16 is turned by the pointer 17 to the predetermined position on the dial as indicated by the figures thereon which will bring the strip 11 into a position to electrically connect the contacts 3 and 4 of the corresponding pair. This operation is repeated for each of the disks, and when all the disks 10 have been properly adjusted all the circuits are closed and the engine can be started. In order to close all the circuits it is necessary for the operator to know the proper combination and to know the proper positions into which the pointer 17 must be adjusted for the various disks.

The construction herein provided is such that the combination can be upset with one movement of the key element 19 thereby making the operation of locking the automobile an extremely simple one. When it is desired to lock the automobile by breaking the connections for each of the circuits, the key element 19 is inserted into the key slot in a position reversed from that shown in Fig. 1, that is, with the extension 21 on the upper side and the spring-pressed pins or tumblers 23 on the lower side. There are as many spring-pressed pins as there are contact elements 10, and these pins have the same spacing as the contact elements. When, therefore, the key 19 is fully inserted there will be one pin 23 opposite each contact element, and if the key is inserted in a position reversed from that shown in Fig. 1, the pins 23 will project through the lower open side of the slot 20. As the key is turned the various spring-pressed pins 23 will drop into the slots 22 of the contact elements 10, thus locking the elements to the key, and continued turning movement of the key will turn the contact elements to break the electrical connection between the corresponding contacts 3 and 4. Hence, it will be seen that by inserting the key 19 into the position reversed from that shown in Fig. 1 and turning the key through one complete revolution, the combination will be upset and the circuits will all be broken, thus locking the automobile. The contact elements 10 are, therefore, adjusted into their non-operative positions simultaneously.

The wires 5 may be connected to the contacts 3 and 4 in any suitable way, but I will preferably thread the ends of said wires through one or more apertures 24 in the contact, as shown in Fig. 3, thus making a permanent connection. The contacts 3 and 4 are entirely inclosed within the casing so that it will not be possible for any unauthorized person to connect the contacts of any pair by a wire or other similar connection.

I have herein shown the wires 5 as extending through slots 25 formed in the sides of the casing. The device is very simple in construction and provides an extremely effective lock.

While I have illustrated herein a selected embodiment of my invention, I do not wish to be limited to the constructional features shown.

I claim:

1. In a device of the class described, the combination with a casing, of a plurality of pairs of contacts carried thereby, a contact element for each pair of contacts, said contact elements being rotatively mounted in the casing and each element adapted in one position thereof to connect electrically the contacts of the corresponding pair, an actuator common to all of said contact elements for adjusting them independently into operative position and a single device for establishing an operative connection between said actuator and each of the contact elements independently.

2. In a device of the class described, the combination with a casing, of a plurality of pairs of contacts carried thereby, a contact element for each pair of contacts, said contact elements being rotatively mounted in the casing and each element adapted in one position thereof to connect electrically the contacts of the corresponding pair, an actuator common to all the elements, and a key element for connecting each element independently to the actuator whereby said element may be adjusted.

3. In a device of the class described, the combination with a casing, of a plurality of pairs of contacts carried thereby, a plurality of contact elements, one for each pair of contacts, rotatably mounted in said casing, each contact element adapted in one position to connect electrically the contacts of the corresponding pair, a slotted spindle on which said contact elements are rotatably mounted, and a key element movable longitudinally of said spindle and adapted to connect each contact element thereto.

4. In a device of the class described, the combination with a casing, of a plurality of pairs of contacts carried thereby, a spindle mounted in said casing and provided with an indicator, a plurality of contact elements rotatably mounted on said spindle, each element adapted in one position to electrically connect the contacts of a pair, means common to all the contact elements to connect each contact element independently to the spindle, and a dial coöperating with said indicator to guide the operator in turning the spindle to adjust properly each contact element.

5. In a device of the class described, the combination with a casing, of a plurality of pairs of contacts carried thereby, a slotted spindle journaled in the casing and provided with an indicator, a plurality of contact elements, one for each pair of contacts rotatably mounted on said spindle and each provided with a slot, and a key element adjustable longitudinally of the slotted spindle and adapted to lock each contact element independently to the spindle whereby said contact element can be independently adjusted into operative position, and a dial coöperating with the pointer to indicate the proper adjustment of the spindle for setting each contact element.

6. In a device of the class described, the combination with a casing, of a plurality of pairs of contacts carried thereby, a contact element for each pair of contacts, said contact elements being rotatably mounted in the casing, and each element adapted in one position thereof to connect electrically the contacts of the corresponding pair, and an actuator common to all of said contact elements for adjusting them and a device common to all said contact elements and adapted in one position to connect them independently to said actuator and in another position to connect them simultaneously to said actuator.

7. In a device of the class described, the combination with a casing, of a plurality of pairs of contacts carried thereby, a plurality of contact elements, one for each pair of contacts, rotatably mounted in the casing, each contact element adapted in one position to connect electrically the contacts of the corresponding pair, a slotted spindle extending axially through the contact elements, and a key element movable longitudinally of said spindle and adapted when inserted into the slot in one position to connect each contact element thereto independently and when inserted into the slot in the reverse position to connect all the contact elements thereto simultaneously.

8. In a device of the class described, the combination with a casing, of a plurality of pairs of contacts carried thereby, a plurality of contact elements, one for each pair of contacts, rotatably mounted in the casing, each contact element adapted in one position to connect electrically the contacts of the corresponding pair, a slotted spindle extending axially through the contact elements, each contact element having a notch, and a key element adapted to be inserted in said slot and provided on one side with an extension adapted in different positions to engage the notches of the different contact elements and on the other side with a plurality of yielding protections one for each contact element.

In testimony whereof, I have signed my name to this specification.

PAUL CYR.

Correction in Reissue Letters Patent No. 14,085.

It is hereby certified that in Reissue Letters Patent No. 14,085, granted March 14, 1916, upon the application of Paul Cyr, of Boston, Massachusetts, for an improvement in "Locks for Automobiles," an error appears in the printed specification requiring correction as follows: Page 3, line 120, claim 8, for the word "protections" read *projections;* and that the said Letters Patent should be read with this correction therein that the same may conform to the record of the case in the Patent Office.

Signed and sealed this 21st day of March, A. D., 1916.

[SEAL.] J. T. NEWTON,

*Acting Commissioner of Patents.*

Cl. 175—282.